United States Patent Office 3,725,037
Patented Apr. 3, 1973

3,725,037
FOAMED ALUMINUM
Currie B. Berry, Jr., and Alex R. Valdo, Baton Rouge, La., assignors to Ethyl Corporation, Richmond, Va.
No Drawing. Filed Feb. 25, 1971, Ser. No. 118,973
Int. Cl. C22c 1/06, 21/00
U.S. Cl. 75—20 F
7 Claims

ABSTRACT OF THE DISCLOSURE

A method of making foamed aluminum having increased strength wherein a portion of the aluminum used in the foaming process is scrap foamed aluminum.

BACKGROUND OF THE INVENTION

Field of the invention

The present invention relates broadly to means and methods of manufacturing foamed metals and more particularly relates to making foamed aluminum bodies having increased strength.

Description of the prior art

In the production of foamed metal, i.e., metal having a plurality of randomly disposed closed cells throughout a metal matrix, a preferred method is to use a heat decomposable foaming agent to generate the gas to form the cells. Foamed metals are generally produced by adding a gas-evolving compound such as a metal hydride to a molten metal such as aluminum and heating the mixture to decompose the compound to generate a gas. The gas expands causing the metal to foam. After foaming, the resultant body is cooled to form a foamed metal solid product. Methods of preparing foamed metals are described in U.S. Pats. 2,751,289; 2,895,819; 2,983,597; 3,300,296; and 3,297,431. U.S. patent application Ser. No. 63,666, filed Aug. 13, 1970 and owned by the assignee of this application, discloses a particularly preferred method of making foamed metals and more particularly foamed aluminum.

Foamed aluminum is normally made by melting a substantially pure aluminum or aluminum alloy.

Although these prior art processes produce foamed metals of excellent quality, foamed aluminum metals do not have sufficient strength for some commercial uses. The present invention provides a simple and economic means of increasing the strength of foamed aluminum bodies. The following description of the invention demonstrates how this is accomplished.

SUMMARY OF THE INVENTION

The present invention provides a foamed aluminum body of substantially increased strength. Foamed aluminum is prepared by melting aluminum or aluminum alloys together with a quantity of scrap foamed aluminum. Scrap foamed aluminum is in effect recycled into the preparation of new foamed aluminum bodies. The amount of scrap foamed aluminum used in the process can be varied to produce a foamed aluminum body having a desired strength.

It is a primary object of the present invention to provide a foamed aluminum body of increased strength and particularly to provide such a body or product in an economical manner.

DESCRIPTION OF THE PREFERRED EMBODIMENTS

In a preferred embodiment of the present invention a quantity of aluminum usually in the form of pigs is melted in a gas-fired furnace. A flux is added to the melt. Subsequently, a quantity of trimmings or scrap from previously prepared foamed aluminum bodies is added to the melt. The quantity of scrap can be varied, depending upon the amount on hand, the amount of foamed aluminum to be made, and the strength desired in the finished product. Excellent results have been obtained using as much as 30 percent scrap foamed aluminum based on the total weight of the melt. After the mixture is molten, flux, oxide and/or dross is skimmed from the surface and the molten metal charge is transferred into a suitable agitated vessel and foaming of the metal is accomplished in any suitable manner. After cooling and solidification a foamed aluminum body is produced which unexpectedly has a substantially higher tensile strength than a comparable foamed aluminum body produced similarly except that no scrap foamed aluminum was used.

The foaming of the molten metal, i.e., the aluminum and the scrap foamed aluminum, may be carried out by a variety of processes known in the art. Preferred processes involve blowing molten metal with a suitable gas generating agent such as lithium hydride, titanium hydried, zirconium hydride and the like. Air or oxygen properly entrained in a molten metal may also be used in preparing such foam. Where a blowing agent such as a metal hydride is used, viscosity control and/or strengthening additives may be used in the molten metal during the foaming process to help control the foam density, pore uniformity and provide optimum strength. Representative examples of suitable processes for preparing foamed metal are found in U.S. Pats. 3,297,431; 3,300,296; 3,305,902; and said U.S. application Ser. No. 63,666.

By aluminum is meant substantially pure aluminum as well as aluminum alloys containing 80 percent or more and preferably 90 percent or more of aluminum. The following aluminum alloys are examples of useful alloys for preparing the foamed metal bodies of the present invention:

Alloy 7075 (1.6% Cu, 2.5% Mg, 0.3% Cr, 5.6% Zn, remainder Al)
Alloy 2024 (4.5% Cu, 0.6% Mn, 1.5% Mg, remainder Al)
Alloy 5086 (0.45% Mn, 4.0% Mg, 0.1% Cr, remainder Al)
Alloy 6063 (0.4% Si, 0.7% Mg, remainder Al)
AA 535 (6–8% Mg in Al)
Alloy 1100 series Al (99.6% minimum Al)
Alloy 2011 (5.5% Cu, 0.5% Pb, 0.5% Bi, remainder Al)
Alloy 2218 (4.0% Cu, 1.5% Mg, 2% Ni, remainder Al)
Alloy 3005 (1.2% Mg, 0.4% Mg, remainder Al)
Alloy 4042 (12.2% Si, 0.9% Cu, 1.1% Mg, 0.9% Ni, remainder Al)
Alloy 4043 (5% Si, 95% Al)
Alloy 8280 (1.5% Si, 1.0% Cu, 0.5% Ni, remainder Al)
Alloy Magnalium—70% Al, 30% Mg In a preferred embodiment of the present invention, scrap foamed aluminum in an amount up to about 50 percent by weight of total metal to be foamed may be used. In a more preferred embodiment, scrap foamed aluminum in an amount of about 30 percent by weight of total metal to be foamed may be used.

Greater amounts of scrap foamed aluminum may be used, and in some circumstances, it might be desirable to use as much as 100 percent scrap foamed aluminum. For most operations, however, blends of scrap foamed aluminum and pure aluminum or aluminum alloy are recommended.

Having thus described the invention, the following examples are illustrative thereof and not limiting of the invention.

EXAMPLE I

A control run was made wherein 220 pounds of fresh AA 535 aluminum alloy containing 7 percent magnesium was melted in a gas fired furnace. A flux containing 3 pounds of sodium chloride, 3 pounds of potassium chloride and 0.3 pound of cryolite was added to the melt. About 15 pounds of flux, oxide and/or dross was then skimmed off the furnace. The remaining 211 pounds of metal was transferred into a suitable agitated vessel and foamed in the usual manner. 1.0 pound of carbon dioxide was used as a thickening agent. 1.6 pounds of zirconium hydride foaming agent were added during agitation of 2400 r.p.m. at 1160° F. After cooling and solidification, the resulting foamed aluminum body had a density of 15 p.c.f. (pounds per cubic foot) and a tensile strength of 200 p.s.i.g.

EXAMPLE II

Using the procedure described in Example I except that 180 pounds of fresh AA 535 aluminum alloy containing 7 percent magnesium were melted in a gas fired furnace, and after the flux was added, 80 pounds of aluminum alloy trimmings from previously made foamed aluminum bodies under the procedure of Example I were added to the furnace. About 40 pounds of flux, oxide and dross was then skimmed off the furnace. The remaining 220 pounds of molten metal was transferred into the agitated vessel and foaming was carried out as in Example I. After cooling and solidification, the resulting foamed aluminum body had a density of 15 p.c.f. and a tensile strength of 350 p.s.i.g. or about 75 percent above the strength of the foam of Example I wherein no scrap foamed aluminum was added.

EXAMPLE III

The procedure of Example II was repeated and the foamed aluminum body produced thereby had a tensile strength of 325 p.s.i.g.

Scrap foamed aluminum produces more dross than pure aluminum or aluminum alloy and allowances for such should be made in making foamed aluminum of a desired density and strength.

Fluxes or flux compositions which have been found to be particularly preferable are those comprising cryolite, sodium chloride and potassium chloride wherein the compounds are distributed in weight percent from about 5-20% 40-47.5% and 40-47.5%, respectively.

From the foregoing examples it is readily apparent that a unique and surprising method has been discovered for producing foamed aluminum bodies having increased tensile strength.

The disclosure and description of the invention herein is illustrative and explanatory thereof and various changes in materials as well as in the details of the described method may be made within the scope of the appended claims without departing from the spirit of the invention.

What is claimed is:
1. A process for making foamed aluminum, comprising the steps of:
    (a) melting a quantity of aluminum and a quantity of scrap foamed aluminum to form a molten metal mixture of aluminum and scrap foamed aluminum;
    (b) foaming the molten metal mixture; and
    (c) solidifying the foamed molten metal mixture to form a foamed aluminum body, said foamed aluminum body having a substantially higher tensile strength than a similarly produced foamed aluminum body except that no scrap foamed aluminum was used.

2. The method of claim 1, wherein a flux is added to the molten aluminum prior to adding the scrap foamed metal.

3. The method of claim 1, wherein a flux comprising sodium chloride, potassium chloride and cryolite is added to the molten aluminum prior to adding the scrap foamed aluminum.

4. The method of claim 1, wherein the scrap foamed aluminum comprises up to about 30 percent by weight of the molten aluminum mixture prior to foaming.

5. The method of claim 2, wherein prior to foaming of the molten metal mixture, flux, oxide and/or dross are skimmed from the surface of the molten metal mixture.

6. The method of claim 1, wherein the aluminum is an aluminum alloy selected from the group consisting of an aluminum alloy containing about 7 percent magnesium, an aluminum alloy containing at least 80 percent aluminum, or aluminum alloy AA 535, or the like.

7. The method of claim 1, wherein the scrap foamed aluminum is an aluminum alloy selected from the group consisting of an aluminum alloy containing about 7 percent magnesium, an aluminum alloy containing at least 80 percent aluminum, or aluminum alloy AA 535, or the like.

References Cited
UNITED STATES PATENTS

| | | | |
|---|---|---|---|
| 2,974,034 | 3/1961 | Fiedler et al. | 75—20 R |
| 3,214,265 | 10/1965 | Fiedler | 75—20 R |
| 3,379,517 | 4/1968 | Graper | 75—20 F |
| 3,508,599 | 4/1970 | Vordahl | 75—20 R X |

L. DEWAYNE RUTLEDGE, Primary Examiner

J. E. LEGRU, Assistant Examiner